United States Patent Office 2,909,499
Patented Oct. 20, 1959

2,909,499

VINYL CHLORIDE COMPOSITIONS CONTAINING ALKYL-1,5-PENTANEDIOL POLYESTERS

Raymond I. Hoaglin, South Charleston, William J. Reid, Charleston, and Robert G. Kelso, St. Albans, W. Va., assignors to Union Carbide Corporation, a corporation of New York No Drawing. Application March 27, 1957
Serial No. 648,775

9 Claims. (Cl. 260—31.6)

This invention relates to plastic compositions containing alkyl-1,5-pentanediol polyesters. More particularly, the present invention relates to plastic compositions containing a vinyl resin and, as a plasticizer therefor, an alkyl-1,5-pentanediol polyester. Unless otherwise indicated, the term "vinyl resin," as used in this specification, means a resin made by polymerizing a vinyl halide, either per se or with another vinyl monomer, and particularly includes resins which contain 85 weight percent or more of polymerized vinyl halide in the polymer, such as polyvinyl chloride and vinyl chloridevinyl acetate copolymers containing 85 percent or more of polymerized vinyl chloride in the polymer.

Vinyl resin compositions may be processed into such diverse articles as calendered film for raincoats, upholstery sheeting, handbags and floor tile; extruded intravenous tubing, garden hose and electrical insulation; slush molded doll parts, rain boots, industrial gloves and athletic pads. Some of these articles may be required to withstand extremes in temperature without cracking, while others may be required to be resistant to extraction of the plasticizer by oil or water. In some of the articles non-flammability may be of prime importance, while in other articles electrical non-conductivity may be most important. Due to the great difference in essential properties required for such a diversity of uses, specific vinyl resin compositions are generally required for the manufacture of each type of article.

In order to achieve a desired set of properties for a particular vinyl resin composition, the resin is modified with one or more carefully selected plasticizers. Plasticizers are generally selected to fulfill certain general requirements which are desirable in all vinyl resin compositions, and one or more specific requirements for which the individual plasticizers are best suited. Where a number of specific properties are required, several plasticizers may be blended to provide the necessary properties or a single plasticizer may be chosen which represents the best compromise between desirable and undesirable properties. Since the use of a combination of plasticizers is usually cumbersome and inefficient and still results in the incorporation into the resin composition of certain undesirable properties, it is preferable to utilize a single plasticizer to accomplish the desired result. Obviously, the more desirable properties that a compound can incorporate into a plastic composition, the more valuable the compound is as a plasticizer.

To be of general interest as a plasticizer, a compound should exhibit good compatibility; low volatility; freedom from odor; chemical, heat and light stability; and resistance to extraction by oil, water and other liquids. Resistance to burning, good electrical properties, a low order of toxicity and the ability to impart excellent low-temperature flexibility are properties which are required for certain specific applications.

Compounds which possess the above enumerated properties and which are also liquid at room temperature are particularly valuable as plasticizers because they are easy to handle and to work into the plastic composition.

Many ester-type plasticizers have been proposed for use in vinyl resins, but no one compound prior to the present invention has been completely satisfactory or has possessed all of the above-enumerated properties to the desired degree.

Diesters such as di(2-ethylhexyl) phthalate, although possessing good low temperature properties, are not as permanent as would be desirable. Such compounds are appreciably volatile and are susceptible to extraction by liquids, such as water and oil. In addition, these compounds tend to migrate from the plasticized article into other materials which come in contact with it.

Higher molecular weight polyesters such as diethylene glycol adipate and 1,2-propylene glycol sebacate have also been proposed as plasticizers. While these compounds have good permanence, they are characterized by relatively poor low temperature properties. Polyesters such as 1,5-pentanediol glutarate and 1,5-pentanediol adipate are also known but are crystalline compounds which are difficult to handle under the usual conditions employed to incorporate plasticizers into vinyl resins.

We have discovered a class of polyester plasticizers which are liquids that can be easily handled in processing operations at room temperatures and which are superior plasticizers for vinyl resins, particularly with respect to their efficiency, their low temperature properties and their permanence, including low volatility and high resistance to extraction.

The polyester plasticizers of the present invention can be represented by the following structural formula:

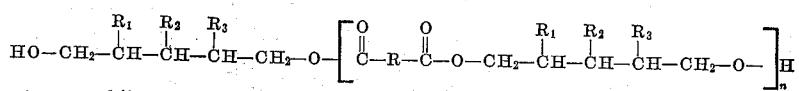

wherein R is a line or branched alkylene radical containing from two to eight carbon atoms; n is a positive integer having a value of from 4 to 12, inclusive; $R_1$, $R_2$ and $R_3$ are radicals selected from the class consisting of hydrogen and alkyl groups containing from 1 to 4 carbon atoms inclusive, the sum of $R_1$, $R_2$, and $R_3$ being no greater than 5 carbon atoms; and, with respect to each grouping in the molecule of the radicals $R_1$, $R_2$ and $R_3$, at least one of said radicals is an alkyl group. The polyesters have molecular weights of from about 1500 to about 4000 (as measured by the Menzies-Wright Method) and viscosities ranging from about 3000 centistokes at 100° F. to about 7000 centistokes at 210° F. They are non-crystalline at room temperature and are capable of gravitational flow at 30° C.

Polyesters which are particularly superior as plasticizers for vinyl resins include 2-ethyl-1,5-pentanediol azelate, 3-methyl-1,5-pentanediol glutarate, 3-methyl-1,5-pentanediol adipate, 3-methyl-1,5-pentanediol azelate, and 3-methyl-1,5-pentanediol sebacate.

The polyesters of the present invention may be prepared by reacting a saturated dibasic acid containing from 4 to 10 carbon atoms or the anhydride of such an acid with a slight molar excess of an alkyl-1,5-pentanediol having the structural formula:

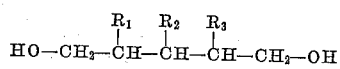

wherein: $R_1$, $R_2$ and $R_3$ are radicals selected from the class consisting of hydrogen and alkyl groups containing from one to 4 carbon atoms, inclusive, at least one of said radicals being an alkyl group and the sum of $R_1$, $R_2$ and $R_3$ being no greater than 5 carbon atoms. The reaction can be conducted at a temperature of from about 150° C. to 250° C. and a pressure of from about atmospheric to about 300 mm. Hg absolute. An entrainer, such as dibutyl ether, should preferably be used to remove the water formed as a co-product during the reaction. Although the esterification will proceed without a catalyst, an acid such as sulfuric acid can be used to increase the rate of reaction. After the reaction has been completed (about 10 to 40 hours), the entrainer is removed by distillation and low boiling material is then removed by steaming or passing nitrogen through the reaction mixture at a temperature of from about 150° C. to about 250° C. and a pressure of from about atmospheric to 10 mm. Hg.

Suitable alkyl-1,5-pentanediols, which may be used to prepare polyesters for use as plasticizer, include, for example, 3-methyl-1,5-pentanediol, 2-methyl-1,5-pentanediol, 2-ethyl-1,5-pentanediol, 2-ethyl-3-methyl-1,5-pentanediol.

Suitable aliphatic dibasic acids or anhydrides, include, for example, succinic, glutaric, 2-methylglutaric, 2-ethylglutaric, 2-ethyl-3-methylglutaric, adipic, pimelic, suberic, azelaic, and sebacic acids.

The polyester may also be prepared by ester exchange of a diester with a slight excess of the desired dihydric alcohol. The ester exchange may be carried out at a temperature of from about 100° C. to about 250° C. and a pressure of from about atmospheric to about 100 mm. Hg, and preferably about 100 mm. Hg, in the presence of a catalyst, such as sodium ethoxide, and the by-product alcohol removed at a pressure of about 100 mm. Hg. The resulting polyester can then be heated at a temperature of from about 200° C. to 250° C. and a pressure of about 2 mm. Hg to remove low-boiling material.

The plastic compositions of this invention may be prepared by incorporating from about 0.11 to about 2.3 parts by weight of one or more of the above-described polyesters in 1 part by weight of a vinyl resin. The plastic compositions may contain, in addition to the vinyl resin and polyester, other plasticizers, stabilizers, fillers, anti-blocking agents, lubricants, ultra-voilet light absorbents, dyes, pigments, nacreous substances and other effect materials.

The following examples are illustrative:

EXAMPLE 1

3-methyl-1,5-pentanediol glutarate

Glutaric anhydride (304 grams, 2.66 moles) and 3-methyl-1,5-pentanediol (339 grams, 2.97 moles) were heated to 165° C. Dibutyl ether was added slowly until a rapid reflux was obtained. Heating was continued until 47 grams of water was removed. The temperature of the reaction mixture was increased to 220° C., and adjusted at that temperature by the addition or removal of dibutyl ether. Heating at 220° C. was continued for 15 hours, at which time the acidity of the mixture had been reduced to less than 0.6 percent (calculated as acetic acid). The reaction mixture was then cooled to 120° C. and was stripped of low-boiling material at a pressure of 10 mm., followed by steaming at a pressure of 60 mm. for 2 hours. The polyester was dried at 120° C. and a pressure of less than 1 mm., and filtered, under pressure through standard "super-cel" filtering aid.

3-methyl-1,5-pentanediol glutarate had a molecular weight of 2140 by the Menzies-Wright method, and a viscosity of 17,545 centistokes at 20° C.

The polyester was compounded with Bakelite resin VYNW (a copolymer containing 95 percent vinyl chloride and 5 percent vinyl acetate) and with 0.5 percent dibutyl tin maleate stabilizer. The compound was milled and molded at 160° C. When evaluated the polyester had an effectiveness of 44.0 percent, a $T_4$ of $-6°$ C., a volatile loss of 0.5 percent in 24 hours at 70° C. from a 0.004-inch film, and the ten-day extraction loss from a 0.004-inch film at 25° C. was 0.7 percent in mineral oil and 1.7 percent in water.

EXAMPLE 2

3-methyl-1,5-pentanediol 3-methylglutarate 3-methylglutaric acid (946 grams, 6.48 moles) and 3-methyl-1,5-pentanediol (830 grams, 7.22 moles) were reacted according to the method outlined in Example 1. The reaction mixture was heated for a period of 14 hours to remove 230 grams of water.

3-methyl-1,5-pentanediol 3-methylglutarate had a molecular weight of 2350 and a viscosity of 26,456 centistokes, at 20° C.

When compounded and evaluated in Bakelite resin VYNW, as in Example 1, the polyester had an effectiveness of 44.5 percent, a $T_4$ of $-2°$ C., a volatile loss of 0.5 percent in 24 hours at 70° C. from a 0.004-inch film, and the ten-day extraction loss from a 0.004-inch film at 25° C. was 1.0 percent in mineral oil and 1.1 percent in water.

EXAMPLE 3

3-methyl-1,5-pentanediol adipate

Adipic acid (44.5 grams, 3 moles) and 3-methyl-1,5-pentanediol (390 grams, 3.3 moles), were reacted at a temperature of 160° C. for 36 hours in the presence of 238 grams of dibutyl ether, which served as an entrainer to remove 105 grams of water. The reaction mixture was further treated by heating at a temperature of 180° C. and a pressure of 80 mm. for 2 hours while a stream of nitrogen was passed continuously through the reaction mixture. The polyester was then filtered under pressure through standard "super-cel" filtering aid.

3-methyl-1,5-pentanediol adipate having a molecular weight of 1655 was compounded with Bakelite resin VYNW as in Example 1, and evaluated as a plasticizer. The polyester had an effectiveness of 42.1 percent, a $T_4$ of $-3°$ C., a volatile loss of 0.7 percent, an oil extraction of 0.7 percent, and a water extraction of 1.6 percent.

EXAMPLE 4

3methyl-1,5-pentanediol sebacate

Sebacic acid (606.7 grams, 3 moles) and 3-methyl-1,5-pentanediol (389.6 grams, 3.3 moles) were reacted at a temperature of 160° C. for 28 hours in the presence of 284 grams of dibutyl ether, which served as an entrainer to remove 102 grams of water.

The reaction mixture was further treated, according to the method outlined in Example 3, to give the polyester 3-methyl-1,5-pentanediol sebacate, having a molecular weight of 1882 and a viscosity of 9,716 centistokes at 100° F.

When compounded and evaluated in Bakelite resin VYNW, as in Example 1, the polyester had an effectiveness of 43.0 percent, a $T_4$ of $-9°$ C., a volatile loss of 0.9 percent, an oil extraction of 1.2 percent, and a water extraction of 0.6 percent.

EXAMPLE 5

2-ethyl-3-methyl-1,5-pentanediol adipate

Adipic acid (298 grams, 2.04 moles) and a 2-ethyl-3-methyl-1,5-pentanediol (328 grams, 2.25 moles) were reacted at a temperature of 160° C. for 16 hours in the presence of 179 grams dibutyl ether, which served as an entrainer to remove 70 grams of water.

The reaction mixture was further treated, according to the method outlined in Example 3, to give the polyester 2-ethyl-3-methyl-1,5-pentanediol adipate.

When compounded and evaluated in Bakelite resin VYNW, as in Example 1, the polyester had an effectiveness of 43.8 percent, a $T_4$ of $-1°$ C., a volatile loss of 0.6 percent, an oil extraction of 1.0 percent, and a water extraction of 0.9 percent.

EXAMPLE 6

2-ethyl-1,5-pentanediol azelate

Azelaic acid (376 grams, 2 moles) and 2-ethyl-1,5-pentanediol (277 grams, 2.10 moles) were reacted at a temperature of 160° C. for 24 hours in the presence of 0.1 percent by weight sulfuric acid. Dibutyl ether (160 grams) was used as an entrainer to remove 68 grams of water.

The reaction mixture was further treated, according to the method outlined in Example 3, to give the polyester 2-ethyl-1,5-pentanediol azelate.

When compounded and evaluated in Bakelite resin VYNW, as in Example 1, the polyester had an effectiveness of 44.4 percent, a $T_4$ of $-12°$ C., a volatile loss of 0.7 percent, an oil extraction of 3.1 percent, and a water extraction of 0.1 percent.

EXAMPLE 7

3-methyl-1,5-pentanediol 2-ethyl-3-methylglutarate

Diethyl 2-ethyl-3-methylglutarate (250 grams, 1.09 moles) and 3-methyl-1,5-pentanediol (135 grams, 1.14 moles), were reacted in the presence of 1.0 percent sodium ethoxide. Ethanol (109 grams) was removed in 1 hour at a kettle temperature of 70° C. to 90° C. and a pressure of 100 mm. The reaction mixture was heated at a temperature of 250° C. and a pressure of 2 mm. for 5 hours. A stream of nitrogen was passed through the reaction mixture, at 150 to 200° C., for 2 hours, while the pressure was maintained at 5 to 10 mm. The polyester was then filtered, under pressure, through standard "super-cel" filtering aid.

3-methyl-1,5-pentanediol 2-ethyl-3-methylglutarate had a molecular weight of 1680 and a viscosity of 3,080 centistokes at 100° F.

When compounded and evaluated in Bakelite resin VYNW, as in Example 1, the polyester had an effectiveness of 46.6 percent, a $T_4$ of $-2°$ C., a volatile loss of 0.6 percent, an oil extraction of 7.9 percent, and a water extraction of 0.6 percent.

EXAMPLE 8

2-methyl-1,5-pentanediol 2-ethyl-3-methylglutarate

Diethyl 2-ethyl-3-methylglutarate (250 grams, 1.09 moles) and 2-methyl-1,5-pentanediol (135 grams, 1.14 moles) were reacted, according to the method outlined in Example 7, to give 2-methyl-1,5-pentanediol 2-ethyl-3-methylglutarate. The polyester had a molecular weight of 2110 and a viscosity of 9,983 centistokes at 100° F.

When compounded and evaluated in Bakelite resin VYNW, as in Example 1, the polyester had an effectiveness of 47.2 percent, a $T_4$ of $-1°$ C., a volatile loss of 0.6 percent, an oil extraction of 3.7 percent, and a water extraction of 0.5 percent.

EXAMPLE 9

3-methyl-1,5-pentanediol adipate

Adipic acid (1168 grams, 8.0 moles) and 3-methyl-1,5-pentanediol (1040 grams, 8.8 moles) were reacted at a temperature of 135° C. to 195° C. for 13.3 hours in the presence of 100 grams of dibutyl ether, which served as an entraining agent to remove 272 grams of water.

The reaction product was heated to 180° C. at a pressure of 1 mm. Hg to remove the dibutyl ether entrainer. A nitrogen atmosphere was maintained at all times to minimize formation of colored oxidation products.

3-methyl-1,5-pentanediol adipate having a molecular weight of 1930 was compounded with Bakelite QYTQ (a polyvinyl chloride resin) as in Example 1, and evaluated as a plasticizer. The polyester had an effectiveness of 44.3 percent, a $T_4$ of $-6°$ C., a volatile loss of 0.7 percent, an oil extraction of 0.3 percent, and a water extraction of 1.9 percent.

EXAMPLE 10

3-methyl-1,5-pentanediol azelate

Azelaic acid (1506 grams, 8.0 moles) and 3-methyl-1,5-pentanediol (946 grams, 8.0 moles) were reacted as a temperature of 211° C. to 225° C. for 17.6 hours in the presence of 100 grams dibutyl ether, which served as an entraining agent to remove 268 grams of water.

The reaction product was heated to 150° C. at a pressure of 1 mm. Hg to remove the dibutyl ether. A nitrogen atmosphere was maintained to minimize color formation due to oxidation.

3-methyl-1,5-pentanediol azelate having a molecular weight of 2180 was compounded with Bakelite QYTQ (a polyvinyl chloride resin) as in Example 1, and evaluated as a plasticizer. The polyester had an effectiveness of 43.8 percent, a $T_4$ of $-3°$ C., a volatile loss of 0.8 percent, an oil extraction of nil, and a water extraction of 0.3 percent.

In order to illustrate the superiority of the present invention, a series of experiments were run. In each experience, the polyester was compounded with Bakelite VYNW (a copolymer containing 95 percent vinyl chloride and 5 percent vinyl acetate) and with 0.5 percent dibutyl tin maleate stabilizer. The mixture was milled and molded at 160° C. The resin in each experiment was evaluated for the following properties: $T_4$, which is defined as the temperature which yields an apparent modulus of elasticity of 10,000 pounds per square inch, according to the work of Clash and Berg, Ind. Eng. Chem. 34, 1218 (1942); volatile loss, which is defined as the percentage loss of plasticizer in 24 hours at 70° C. from a 0.004-inch film; and the extraction loss (over a ten day period) in water and oil which is defined as the loss of plasticizer from a 0.004-inch film at 25° C. when the film is immersed in water and in oil, respectively. The plasticizers tested and the results obtained are shown in Table I, below.

TABLE I

| Plasticizer | Effectiveness, percent [a] | $T_4$ ° C. | Volatile Loss, percent | Extraction Loss | |
|---|---|---|---|---|---|
| | | | | Oil, percent | Water, percent |
| 3 - Methyl - 1,5-pentanediol adipate | 42.1 | −3 | 0.7 | 0.7 | 1.6 |
| 2 - Ethyl - 1,3 hexanediol adipate | 46.4 | +1 | 0.7 | 4.5 | 0.2 |
| Diethylene glycol adipate | 45.0 | −3 | 1.2 | 10.0 | 1.6 |
| Di(2 - ethylhexyl) phthalate | 38.4 | −8 | 4.2 | 18.0 | 0.1 |

[a] "Effectiveness" is the percentage of plasticizer required to produce a 100 percent elongation modulus of 1000 p.s.i.a. in the compounded resin It can be seen from Table I that 3-methyl-1,5-pentanediol adipate possesses a combination of properties which is superior to any of the other plasticizers tested. Unless otherwise specified, parts and percentages, as used herein, are by weight.

We claim:

1. A plastic composition comprising a vinyl resin containing at least 85 percent by weight of polymerized vinyl chloride and selected from the group consisting of polyvinyl chloride and copolymers of vinyl chloride and vinyl acetate and from about 0.11 to about 2.3 parts, per part of vinyl resin, of a polyester having the following structural formula:

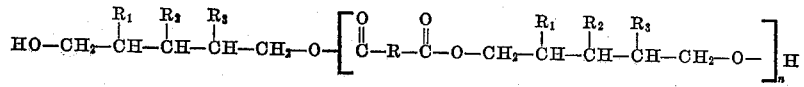

wherein R is an alkylene radical containing from two to eight carbon atoms; $n$ is a positive integer having a value of from 4 to 12, inclusive; $R_1$, $R_2$ and $R_3$ are radicals selected from the class consisting of hydrogen and alkyl groups containing from 1 to 4 carbon atoms, inclusive, the sum of $R_1$, $R_2$ and $R_3$ being no greater than 5 carbon atoms; and, with respect to each grouping in the molecule of the radicals $R_1$, $R_2$ and $R_3$, at least one of said radicals is an alkyl group.

2. A plastic composition comprising a vinyl resin containing at least 85 percent by weight of polymerized vinyl chloride selected from the group consisting of polyvinyl chloride and copolymers of vinyl chloride and vinyl acetate and from 0.11 to 2.3 parts, per part of vinyl resin, of 3-methyl-1,5-pentanediol glutarate.

3. A plastic composition comprising a vinyl resin containing at least 85 percent by weight of polymerized vinyl chloride and selected from the group consisting of polyvinyl chloride and copolymers of vinyl chloride and vinyl acetate and from 0.11 to 2.3 parts, per part of vinyl resin, of 3-methyl-1,5-pentanediol 3-methyl glutarate.

4. A plastic composition comprising a vinyl resin containing at least 85 percent by weight of polymerized vinyl chloride selected from the group consisting of polyvinyl chloride and copolymers of vinyl chloride and vinyl acetate and from 0.11 to 2.3 parts, per part of vinyl resin, of 3-methyl-1,5-pentanediol adipate.

5. A plastic composition comprising a vinyl resin containing at least 85 percent by weight of polymerized vinyl chloride selected from the group consisting of polyvinyl chloride and copolymers of vinyl chloride and vinyl acetate and from 0.11 to 2.3 parts, per part of vinyl resin, of 3-methyl-1,5-pentanediol sebacate.

6. A plastic composition comprising a vinyl resin containing at least 85 percent by weight of polymerized vinyl chloride selected from the group consisting of polyvinyl chloride and copolymers of vinyl chloride and vinyl acetate and from 0.11 to 2.3 parts, per part of vinyl resin, of 2-ethyl-1,5-pentanediol adipate.

7. A plastic composition comprising a vinyl resin consisting at least 85 percent by weight of polymerized vinyl chloride selected from the group consisting of polyvinyl chloride and copolymers of vinyl chloride and vinyl acetate and from 0.11 to 2.3 parts, per part of vinyl resin, of 2-ethyl-1,5-pentanediol azelate.

8. A plastic composition comprising a vinyl resin containing at least 85 percent by weight of polymerized vinyl chloride selected from the group consisting of polyvinyl chloride and copolymers of vinyl chloride and vinyl acetate and from 0.11 to 2.3 parts, per part of vinyl resin, of 3-methyl-1,5-pentanediol 2-ethyl-3-methyl glutarate.

9. A plastic composition comprising a vinyl resin containing at least 85 percent by weight of polymerized vinyl chloride selected from the group consisting of polyvinyl chloride and copolymers of vinyl chloride and vinyl acetate and from 0.11 to 2.3 parts, per part of vinyl resin, of 2-methyl-1,5-pentanediol 2-ethyl-3-methyl glutarate.

References Cited in the file of this patent

UNITED STATES PATENTS

| | | |
|---|---|---|
| 2,460,186 | Moffett | Jan. 25, 1949 |
| 2,647,098 | Smith et al. | July 28, 1953 |
| 2,726,225 | Pockel | Dec. 6, 1955 |